(12) United States Patent
Rarig et al.

(10) Patent No.: US 7,947,118 B2
(45) Date of Patent: May 24, 2011

(54) CONTAINERIZED GAS SEPARATION SYSTEM

(75) Inventors: David Lester Rarig, Emmaus, PA (US); Roger Dean Whitley, Allentown, PA (US); Matthew James LaBuda, Fogelsville, PA (US); James Michael Occhialini, New Tripoli, PA (US); Kevin Alan Lievre, Allentown, PA (US); Michael S. Yankovoy, Wescosville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 193 days.

(21) Appl. No.: 12/020,167

(22) Filed: Jan. 25, 2008

(65) Prior Publication Data

US 2008/0282883 A1 Nov. 20, 2008

Related U.S. Application Data

(60) Provisional application No. 60/938,099, filed on May 15, 2007.

(51) Int. Cl.
*B01D 53/047* (2006.01)
(52) U.S. Cl. .................. 95/98; 95/130; 96/124; 96/147
(58) Field of Classification Search .................. 96/121, 96/124, 130, 143, 144, 147; 95/96, 98, 105, 95/130, 148; 128/204.18
See application file for complete search history.

(56) References Cited

U.S. PATENT DOCUMENTS

| 5,961,697 | A | * | 10/1999 | McManus et al. | 96/126 |
| 6,436,175 | B1 | | 8/2002 | Coates et al. | |
| RE38,493 | E | | 4/2004 | Keefer et al. | |
| 6,910,350 | B2 | * | 6/2005 | Brigham et al. | 62/643 |
| 6,936,091 | B2 | * | 8/2005 | Bayreuther | 95/100 |
| 2005/0056661 | A1 | | 3/2005 | Casamatta et al. | |
| 2005/0098034 | A1 | * | 5/2005 | Gittleman et al. | 95/96 |
| 2005/0204923 | A1 | * | 9/2005 | Nakamura et al. | 96/128 |
| 2006/0278359 | A1 | | 12/2006 | Wheaton et al. | |
| 2008/0000353 | A1 | * | 1/2008 | Rarig et al. | 95/100 |
| 2008/0022851 | A1 | * | 1/2008 | Lee et al. | 95/96 |
| 2008/0092740 | A1 | * | 4/2008 | Vandroux et al. | 96/4 |

FOREIGN PATENT DOCUMENTS

| WO | 2006018558 A1 | | 2/2006 |
| WO | WO 2006/018558 A1 | * | 2/2006 |
| WO | 2006/128470 A | | 12/2006 |

* cited by examiner

*Primary Examiner* — Frank M Lawrence
(74) *Attorney, Agent, or Firm* — Willard Jones, II (57) ABSTRACT

Containerized gas separation system comprising (a) a container having an interior, an exterior, and an exterior volume defined by the exterior dimensions of the container and (b) a pressure swing adsorption system installed in the interior of the container and adapted to recover a product gas from a feed gas mixture, the pressure swing adsorption system being adapted to deliver the product gas at a product gas flow rate, wherein the ratio of the exterior volume of the container to the product gas flow rate is less than about 2000 $ft^3$/(ton per day).

21 Claims, 3 Drawing Sheets

CONTAINERIZED GAS SEPARATION SYSTEM

CROSS-REFERENCE TO RELATED APPLICATIONS

This application claims priority to U.S. Provisional Application Ser. No. 60/938,099 filed on May 15, 2007. This provisional application is wholly incorporated herein by reference.

BACKGROUND OF THE INVENTION

Gas separation systems for the production of industrial gases range in size from large onsite systems constructed by assembling previously manufactured components at the plant site to smaller transportable systems that are shop-fabricated on skids, transported to an operating site, and installed at the site. These portable systems also can be moved from site to site as customer requirements change. Pressure swing adsorption (PSA) systems are amenable to portable designs of smaller plants which may be used, for example, in air separation for the production of oxygen or nitrogen in typical product ranges up to about 50 ton per day. Components of PSA systems may be shop-mounted on steel-framed skids that are transported with other components to a site for final assembly and commissioning. The dimensions of the skid and components should be amenable to standard highway truck and trailer dimensions for transport to the installation site.

Standardization of the dimensions of portable gas separation plants including PSA systems is desirable for economic and marketing reasons. In addition, it is desirable to maximize the product capacities of transportable gas separation systems relative to standard shipping dimensions for existing transportation systems. There is a need in the art for the development of portable gas separation systems having improved cost, marketing, and transportation characteristics. This need is addressed by the embodiments of the invention described below and defined by the claims that follow.

BRIEF SUMMARY OF THE INVENTION

An embodiment of the invention relates to a containerized gas separation system comprising (a) a container having an interior, an exterior, and an exterior volume defined by the exterior dimensions of the container and (b) a pressure swing adsorption system installed in the interior of the container and adapted to recover a product gas from a feed gas mixture, the pressure swing adsorption system being adapted to deliver the product gas at a product gas flow rate, wherein the ratio of the exterior volume of the container to the product gas flow rate is less than about 2000 ft$^3$/(ton per day).

Another embodiment of the invention includes a containerized gas separation system comprising one or more ISO containers, each ISO container having installed therein one or more components of a pressure swing adsorption system selected from the group consisting of
  (a) two or more vessels, each vessel having a feed end, a product end, and adsorbent material adapted to adsorb one or more components from the feed gas mixture to provide a product gas;
  (b) a product gas storage tank;
  (c) a feed blower adapted to introduce the feed gas mixture into the feed ends of the vessels and a feed blower driver;
  (d) a vacuum blower adapted to withdraw waste gas from the product ends of the vessels and a vacuum blower driver; and
  (e) an indexed rotatable multi-port valve adapted to place the product end of each vessel in sequential flow communication with the product end of each of the other vessels.

A related embodiment of the invention includes a containerized gas separation system comprising an ISO container having installed therein a pressure swing adsorption system adapted to separate air to provide an oxygen-containing product gas having a composition of at least 80 vol % oxygen, wherein the pressure swing adsorption system comprises
  (a) four vessels, each vessel having a feed end, a product end, and adsorbent material adapted to selectively adsorb nitrogen from air to provide the oxygen-containing product gas at a product gas flow rate equal to or less than a product gas design flow rate;
  (b) a product gas storage tank;
  (c) a feed blower adapted to introduce the pressurized air into the feed ends of the vessels and a feed blower driver;
  (d) a vacuum blower adapted to withdraw waste gas from the product ends of the vessels and a vacuum blower driver; and
  (e) an indexed rotatable multi-port valve adapted to place the product end of each vessel in sequential flow communication with the product end of each of the other vessels.

Another related embodiment includes a method for the recovery of a product gas from a feed gas mixture comprising
  (a) providing a gas separation system comprising an ISO container having installed therein a pressure swing adsorption system comprising
    (1) two or more vessels, each vessel having a feed end, a product end, and adsorbent material adapted to adsorb one or more components from the feed gas mixture to provide a product gas at a product gas flow rate;
    (2) a product gas storage tank;
    (3) a feed blower adapted to introduce the feed gas mixture into the feed ends of the vessels and a feed blower driver;
    (4) a vacuum blower adapted to withdraw waste gas from the product ends of the vessels and a vacuum blower driver; and
    (5) an indexed rotatable multi-port valve adapted to place the product end of each vessel in sequential flow communication with the product end of each of the other vessels;
  (b) introducing the feed gas mixture into a first vessel and withdrawing the product gas from the first vessel at the product gas flow rate;
  (c) depressurizing the first vessel by withdrawing depressurization gas from the product end of the vessel and transferring the depressurization gas to the product end of another vessel via the indexed rotatable multi-port product valve while the indexed rotatable multi-port product valve is in a first indexed rotational position;
  (d) withdrawing waste gas from the feed end of the first vessel;
  (e) pressurizing the first vessel by introducing into the product end of the vessel a depressurization gas provided from another vessel that is undergoing step (c), wherein the gas is transferred via the indexed rotatable multi-port product valve while the indexed rotatable multi-port product valve is in a second indexed rotational positions and
  (f) repeating steps (b) through (e) in a cyclic manner.

A further embodiment of the invention relates to a method for the installation of a pressure swing adsorption system at an operating site comprising (a) assembling a containerized pressure swing adsorption system at an assembly site wherein the system comprises one or more ISO containers, each ISO container having installed therein one or more components of a pressure swing adsorption system selected from the group consisting of
  (1) two or more vessels, each vessel having a feed end, a product end, and adsorbent material adapted to adsorb one or more components from the feed gas mixture to provide a product gas;
  (2) a product gas storage tank;
  (3) a feed blower adapted to introduce the feed gas mixture into the feed ends of the vessels and a feed blower driver;
  (4) a vacuum blower adapted to withdraw waste gas from the product ends of the vessels and a vacuum blower driver; and
  (5) an indexed rotatable multi-port valve adapted to place the product end of each vessel in sequential flow communication with the product end of each of the other vessels;
(b) transporting the containerized pressure swing adsorption system from the assembly site to the operating site; and
(c) unloading the containerized pressure swing adsorption system and placing it on the operating site, connecting utilities to the system, and installing piping adapted to provide the product gas to a gas consumer.

BRIEF DESCRIPTION OF SEVERAL VIEWS OF THE DRAWINGS

These drawings illustrate embodiments of the invention, are not necessarily to scale, and are not meant to limit these embodiments to any of the features shown therein.

DETAILED DESCRIPTION OF THE INVENTION

The embodiments of the present invention are directed to portable gas separation systems, particularly PSA systems, wherein the system components are installed in shipping containers. These shipping containers may be, for example, standard containers having designs and dimensions defined by the International Organization for Standardization (ISO). The PSA systems described herein are designed to minimize the ratio of the volume of the container in which the system components are installed to the system gas production capacity. The installation of all components within standardized containers according to embodiments of the invention provides modular, turnkey, self-contained, transportable gas separation systems.

The embodiments of the present invention are directed broadly to a containerized gas separation system comprising (a) a container having an interior, an exterior, and an exterior volume defined by the exterior dimensions of the container and (b) a pressure swing adsorption (PSA) system installed in the interior of the container and adapted to recover a product gas from a feed gas mixture, wherein the pressure swing adsorption system is adapted to deliver the product gas at a product gas flow rate. The system is designed to minimize the ratio of the exterior volume of the container to the product gas flow rate. The ratio of the exterior volume of the container (when defined in $ft^3$) to the product gas flow rate (when defined as ton per day of total product flow), for example, may be less than about 2000 $ft^3$/(ton per day). In some embodiments, this ratio may be less than about 1000 $ft^3$/(ton per day), while in specific embodiments the ratio may be less than about 500 $ft^3$/(ton per day).

In the present disclosure, the term "container" means any structure adapted to enclose the components of the gas separation system. A container may be, for example, a right parallelepiped structure that is transportable by standard transportation methods including any of a truck, a train, a barge, a ship, or an airplane. A container or containers may be capable of containing and supporting all major components of the PSA system so that the system can be shipped as one or more complete modules. One type of container that may be used in embodiments of the invention is the standard ISO shipping container as defined by the International Organization for Standardization.

The term "containerized" defines a configuration wherein a self-contained gas separation system is installed in one or more containers. A containerized gas separation system may be transportable, i.e., it may be adapted for transportation by truck, train, barge, ship, or airplane as one or more modular containers. These containers may comprise, for example, one or more standard ISO shipping containers.

ISO shipping containers are available world-wide at reasonable cost. Standard ISO containers have lengths of 20 ft (6.1 m), 40 ft (12.2 m), 45 ft (13.7 m), 48 ft (14.6 m), and 53 ft (16.2 m). The standard 20, 40, 48, and 53 ft containers have an external width of 8 ft, an external height of 8 ft 6 in, an internal width of 7 ft 8⅝ in, and an internal height of 7 ft 9⅞ in. The 45 ft container is a "high-cube" container having an external height of 9 ft 6 in. The 20 ft container is the most common container worldwide, but the 40 ft container is increasingly replacing it, particularly since costs tend to be per container and not per unit of container length. The longer container types are also becoming more common, especially in North America. ISO containers are designed for standardized transportation on trucks, ships, and trains, and the containers also may be shipped conveniently by barge and airplane.

The term "product gas flow rate" when applied to a product gas from a PSA system means the total flow rate of the product stream which contains a specific desired component. For example, a PSA product gas may contain mostly oxygen as the desired product component and one or more impurities as the remaining components; in this case, the product flow rate is defined as the flow rate of the product gas including the oxygen and all of the remaining impurities.

The term "ton" refers to a mass equivalent to 2000 lb and may also be referred to as a "short ton."

The terms "flow communication" and "in flow communication with" as applied to a first and a second region mean that fluid can flow from the first region to the second region, and/or from the second region to the first region, through an intermediate region. The intermediate region may comprise connecting piping and valves between the first and second regions.

The term "sequential" has the usual meaning of relating to or arranged in a sequence. When applied to the use of an indexed rotatable multi-port valve in a pressure swing adsorption system as described below, the term relates to a repeatable series of fixed positions of the rotatable member of the valve as it is rotated intermittently between the positions. The term also applies to the steps in a pressure swing adsorption cycle wherein each step follows the same preceding step in a cyclically repeating series of steps. The term "sequential flow communication" as applied to the product end of an adsorbent vessel means that the product end of that vessel is placed in flow communication in turn with each of the other vessels in the steps of a PSA operating cycle.

The term "rotatable" refers to a valve member having an axis about which the member can be rotated discontinuously or intermittently between positions, wherein the member remains in a fixed position between periods of rotational movement from one position to the next sequential position. The term "indexed" means that the positions are fixed relative to one another.

The generic term "pressure swing adsorption" (PSA) as used herein applies to all adsorptive separation systems operating between a maximum and a minimum pressure. The maximum pressure typically is super-atmospheric, and the minimum pressure may be super-atmospheric, atmospheric, or sub-atmospheric. When the minimum pressure is sub-atmospheric and the maximum pressure is super-atmospheric, the system typically is described as a pressure vacuum swing adsorption (PVSA) system. When the maximum pressure is at or below atmospheric pressure and the minimum pressure is below atmospheric pressure, the system is typically described as a vacuum swing adsorption (VSA) system.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity.

Figure 1:
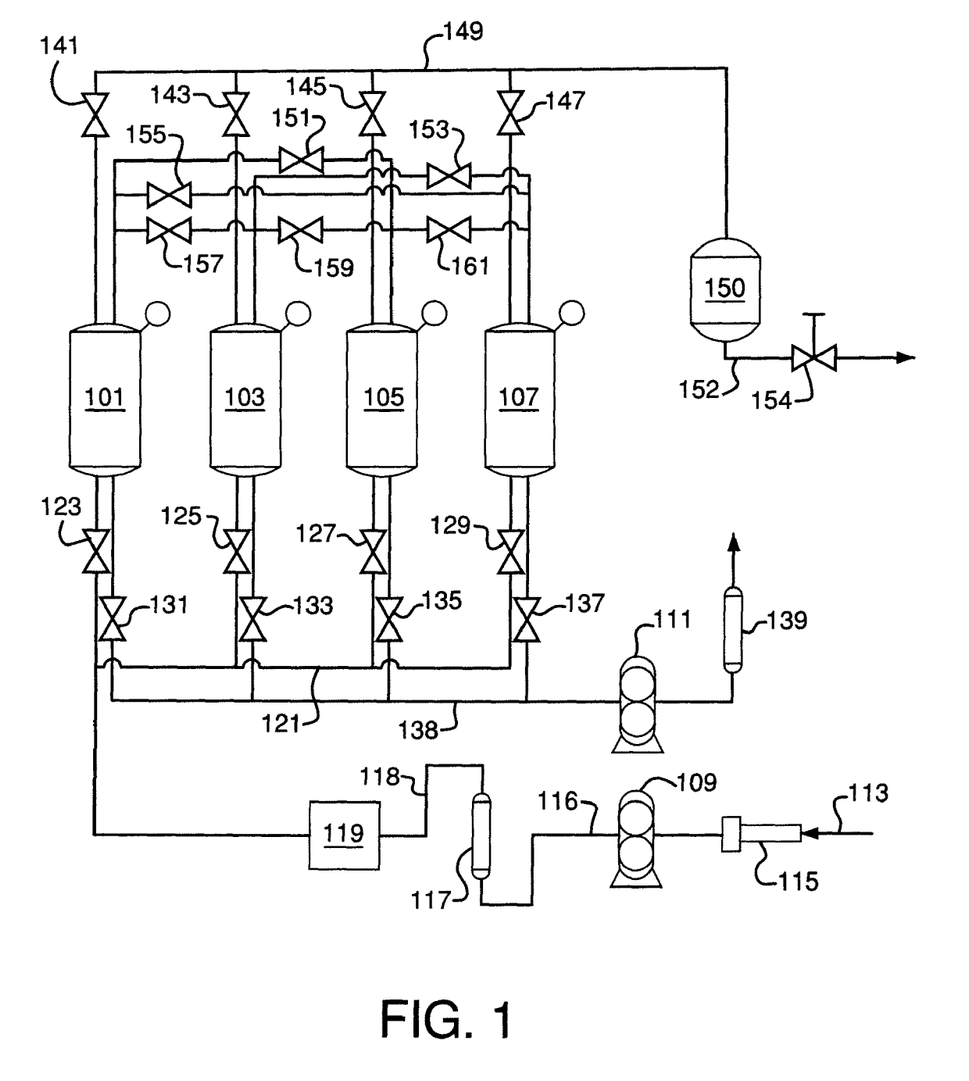
FIG. 1 is a schematic process diagram of a four-bed pressure swing adsorption gas separation system.

One embodiment of the invention utilizes a PSA system to effect the separation of air to produce oxygen. A typical four-bed PSA system known in the art is illustrated in FIG. 1 wherein selective adsorbent material is contained in adsorbent vessels 101, 103, 105, and 107, feed gas is introduced into the system by feed blower 109, and waste gas is withdrawn from the system by vacuum blower 111. Inlet air flows via line 113 through silencer 115, is compressed in blower 109, passes through line 116, silencer 117, and is cooled in aftercooler 119. Feed gas is provided via feed manifold 121 and block valves 123, 125, 127, and 129 to the feed ends of adsorbent vessels 101, 103, 105, and 107, respectively. Waste gas is withdrawn from the feed ends of the adsorbent vessels through switching valves 131, 133, 135, and 137 and waste gas manifold 138 by vacuum blower 111, which discharges waste gas through silencer 139.

Product gas is withdrawn via block valves 141, 143, 145, and 147 from the product ends of adsorbent vessels 101, 103, 105, and 107, respectively. Product gas passes through product manifold 149 to product tank 150, from which it is provided to the consumer via line 152 and flow control valve 154. Gas transfer between adsorbent vessels 101 and 105 flows through connecting piping and block valve 151, gas transfer between adsorbent vessels 103 and 107 flows through connecting piping and block valve 153, gas transfer between adsorbent vessels 101 and 107 flows through connecting piping and block valve 155, gas transfer between adsorbent vessels 101 and 103 flows through connecting piping and block valve 157, gas transfer between adsorbent vessels 103 and 105 flows through connecting piping and block valve 159, and gas transfer between adsorbent vessels 105 and 107 flows through connecting piping and block valve 161.

There are several features in the PSA system of FIG. 1 that may contribute to high capital expense and complicated operating problems. First, there are 18 switching block valves operated by individual electronic or pneumatic actuators that are typically controlled by a programmable logic controller (PLC) or computer control system. Second, small differences among the actuation times for the multiple block valves can escalate into significant differences after long periods of operating time. This is of particular concern in rapid PSA cycles because these time differences can become larger fractions of the cycle step time durations. Additional logic would be required in the controller to autocorrect this problem. Third, the switching block valves have moving parts that would need replacement over time as they wear, some at different rates than others.

As an alternative to using the multiple block valves shown in FIG. 1, embodiments of the present invention may utilize indexed rotatable multi-port valves at the feed and product ends of the adsorbent vessels. An indexed rotatable multi-port valve is defined as a valve comprising a rotatable member disposed within a valve body wherein the rotatable member and the valve body are coaxial and have circular cross sections in any plane perpendicular to the axis. The outer surface of the rotatable member and the inner surface of the valve body are non-planar. The rotatable member and the valve housing each has a plurality of passages wherein selected combinations of the passages in the member and body are placed in flow communication when the member is set at respective specific indexed circumferential positions.

Rotation of the rotatable member is intermittent and the valve is indexed, which means that rotation occurs only to change the circumferential position of the member and no rotation occurs while the member is in a fixed indexed circumferential position. Each fixed circumferential position of the rotatable member is considered an indexed position relative to the valve body, and the rotatable member returns to a given indexed position during each revolution about its axis.

Figure 2:
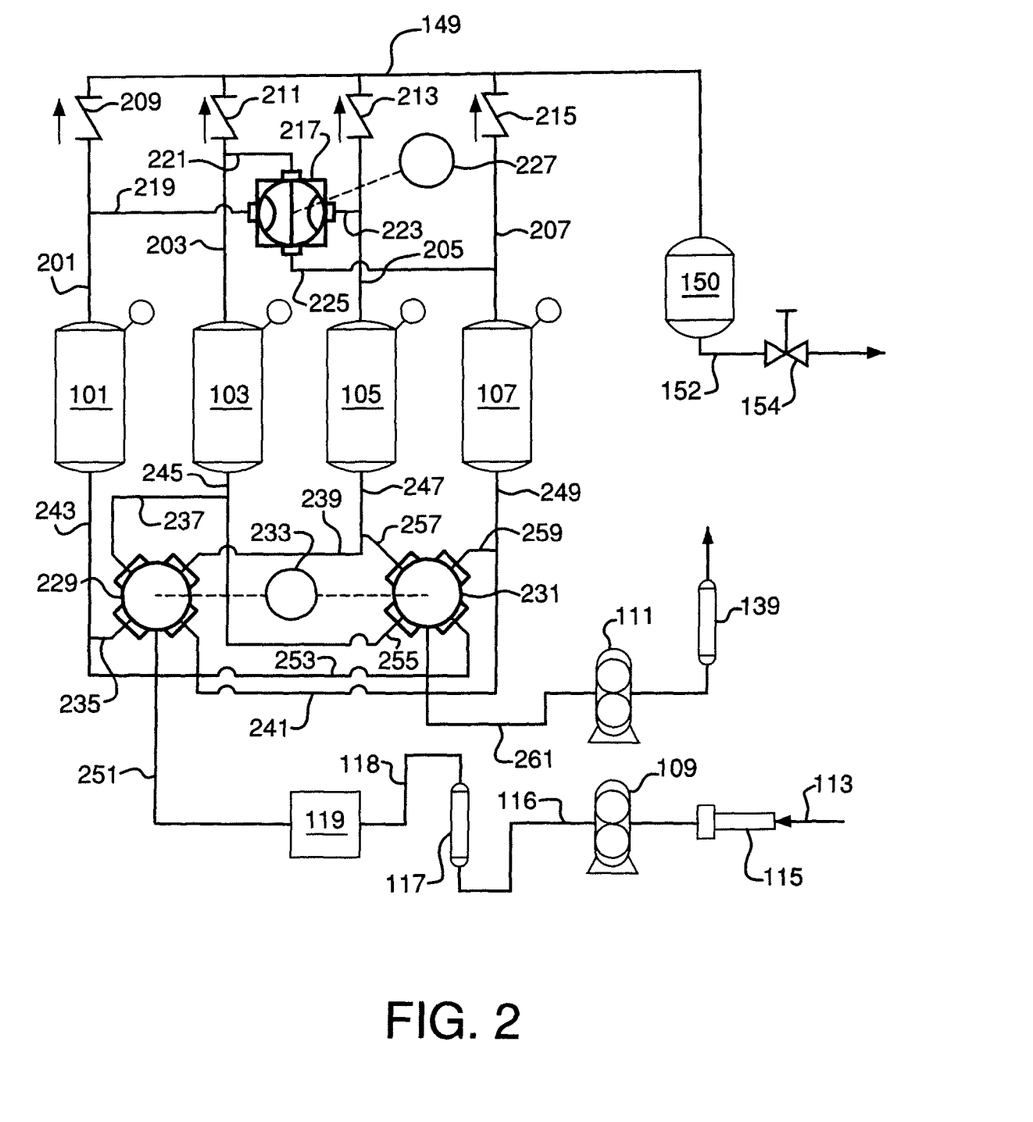
FIG. 2 is a schematic process diagram of a four-bed pressure swing adsorption gas separation system used in an embodiment of the present invention.

An exemplary four-bed PSA system using indexed rotatable valves is illustrated in FIG. 2 and includes adsorbent vessels 101, 103, 105, and 107, feed blower 109, vacuum blower 111, inlet line 113, silencer 115, line 116, silencer 117, line 118, aftercooler 119, waste gas discharge line 261, silencer 139, product tank 150, product line 152, and control valve 154. Outlet lines 201, 203, 205, and 207 from adsorbent vessels 101, 103, 105, and 107, respectively, are connected to product manifold 149 via check valves 209, 211, 213, and 215, respectively. Product tank 150 may be filled with an oxygen adsorbent, for example an X-type zeolite which has been at least partially exchanged with calcium cations, in order to increase the effective gas storage density within the product tank, thereby reducing tank size and pressure fluctuations in the product delivery pressure.

Gas flows between the product ends of the adsorbent vessels are directed by indexed rotatable multi-port valve 217, which has four external ports connected via lines 219, 221, 223, and 225, respectively, to outlet lines 201, 203, 205, and 207 from adsorbent vessels 101, 103, 105, and 107, respectively. Lines 219, 221, 223, and 225 optionally may contain manual or automated regulating valves (not shown) for optimizing the performance of the system. Indexed rotatable multi-port valve 217 has an internal rotatable member having internal passages adapted to place specific pairs of lines 219, 221, 223, and 225 in flow communication according to the PSA cycle operating in adsorbent vessels 101, 103, 105, and 107. The rotatable internal member is rotated by indexing valve drive motor 227, which moves the member intermittently in a single rotary direction with precise 45 degree increments and has eight different positions to align selected passages in the rotatable member with selected passages in the valve body as described below. The indexing valve drive motor utilizes precise, high-frequency motion control for proper alignment in the eight positions. The indexing valve drive motor may have a built-in timer to control the time duration of each position of the rotatable internal member; alternatively, an external timer may be used or timing may be communicated from a programmable logic controller (PLC) or a computer control system (not shown). The indexing valve motor may also have a brake on the shaft to minimize coasting of the rotor. The valve shaft may also have an external optical, mechanical, or magnetic positioning sensor to provide initial alignment of the valve, as well as to provide a shut down signal if the valve does not rotate through the cycle within a time specified in the controller.

Indexed rotatable multi-port valves are described in U.S. Patent Application Publication No. 2008/0000353 A1 published on Jan. 3, 2008 and entitled "Pressure Swing Adsorption System with Indexed Rotatable Multi-Port Valves", which publication is wholly incorporated herein by reference.

Gas flows at the feed ends of the adsorbent vessels are directed by indexed rotatable multi-port valves 229 and 231, each of which has four external ports and one inlet or outlet port. The rotatable internal members of valves 229 and 231 are rotated by indexing valve drive motor 233, which moves each member intermittently in a single rotary direction with precise 90 degree increments and has four different positions to align a passage in the rotatable member with selected passages in the valve body as described below. The indexing valve drive motor utilizes precise, high-frequency motion control for proper alignment in the four positions. The indexing valve drive motor may have a built-in timer to control the time duration of each position of the rotatable internal member; alternatively, an external timer may be used or timing may be communicated from a programmable logic controller (PLC) or a computer control system (shown in FIG. 3 below) that controls both indexing valve drive motors 227 and 233. In another alternative, indexing valve drive motor 227 may have a built-in timer that controls both indexing valve drive motors 227 and 233, thereby ensuring that the indexed movement of valves 217, 229, and 231 is always synchronized and consistent. The indexing valve motor may also have a brake on the shaft to minimize coasting of the rotor. The valve shaft may also have an external optical, mechanical, or magnetic positioning sensor to provide initial alignment of the valve as well as to provide a shut down signal if the valve does not rotate through the cycle within a time specified in the controller.

The external ports of indexed rotatable multi-port valve 229 are connected via lines 235, 237, 239, and 241, respectively, to inlet/outlet lines 243, 245, 247, and 249 at the feed ends of adsorbent vessels 101, 103, 105, and 107, respectively. The inlet port of indexed rotatable multi-port valve 229 is connected via feed line 251 to feed gas aftercooler 119 and serves to deliver in pressurized feed gas to the adsorbent vessels. As described later, indexed rotatable multi-port valve 229 has an internal rotatable member having internal passages adapted to deliver pressurized feed gas to each of adsorbent vessels 101, 103, 105, and 107 in turn according to the PSA operating cycle.

The external ports of indexed rotatable multi-port valve 231 are connected via lines 253, 255, 257, and 259, respectively, to inlet/outlet lines 243, 245, 247, and 249 at the feed ends of adsorbent vessels 101, 103, 105, and 107, respectively. The outlet port of indexed rotatable multi-port valve 231 is connected waste gas line 261 to vacuum blower 111 and serves to withdraw waste gas from the adsorbent vessels. As described later, indexed rotatable multi-port valve 231 has an internal rotatable member having internal passages adapted to withdraw waste gas from each of adsorbent vessels 101, 103, 105, and 107 in turn according to the PSA operating cycle.

The operation of the exemplary pressure swing adsorption system described above may be illustrated by a four-bed PSA process for the separation of oxygen from air to yield a product containing at least 80 vol % oxygen at 15 to 29.7 psia. The process may operate between a maximum pressure as high as 29.7 psia and a minimum pressure as low as 2 psia. If higher product pressure is required, an optional booster compressor can be used to raise the product pressure to 125 psia or higher. In this process, each of adsorbent vessels 101, 103, 105, and 107 contains a bed of adsorbent material, which may include any known adsorbent for producing oxygen from air such as, for example, the zeolites CaA, NaX, CaX, and LiX. In the case of X zeolites, the $SiO_2/Al_2O_3$ ratio may range from 2.0 to 2.5. In the case of ambient air feed, a pretreatment layer of adsorbent to remove water and/or $CO_2$ may be used. These pretreatment layer adsorbents may include alumina and NaX, as well as others known in the art. LiX zeolite with an $SiO_2/Al_2O_3$ ratio of 2.0 is useful for the separation of oxygen from air and is known as LiLSX (Li Low Silica X). The LiLSX selectively adsorbs nitrogen at ambient or near-ambient temperature to yield an oxygen product containing at least 80 vol % oxygen at 15 to 29.7 psia. Oxygen product purity in some embodiments contains at least 87 vol % oxygen. The cycle may operate between a maximum pressure as high as 29.7 psia and a minimum pressure as low as 2 psia.

An eight-step PSA cycle may be used as described below.

1. Introducing a pressurized feed gas into the feed end of a first adsorbent bed wherein the more strongly adsorbable component is removed by the adsorbent and the less strongly adsorbed component is withdrawn from a product end of the first adsorbent bed as product gas, all of which is final product gas sent to an optional final product gas holding tank and from there to a downstream user.

2. Continuing the introduction of feed gas into the feed end of the first adsorbent bed wherein the more strongly adsorbable component is removed by the adsorbent and the less strongly adsorbed component passes through the product end of the adsorbent bed as product gas, a portion of which is final product gas sent to the optional final product gas holding tank and from there to the downstream user, and another portion of which is introduced into the product end of another adsorbent bed undergoing countercurrent repressurization (step 8), and continuing until the adsorption front of the more strongly adsorbable component approaches the product end of the first adsorbent bed.

3. Concurrently depressurizing the first adsorbent bed beginning at the bed pressure in step 2 by withdrawing depressurization gas from the product end of the bed while the pressure in the bed drops to a first intermediate pressure, wherein the depressurization gas is introduced countercurrently into the product end of an adsorbent bed undergoing pressure equalization (step 7).

4. Concurrently depressurizing the first adsorbent bed beginning at the first intermediate pressure by withdrawing additional depressurization gas from the product end of the bed while the pressure in the bed drops to a second intermediate pressure, wherein the depressurization gas is introduced countercurrently into the product end of an adsorbent bed undergoing purge (step 6).

5. Depressurizing the first adsorbent bed countercurrently from the second intermediate pressure wherein void space and desorbed gas is withdrawn from the first adsorbent bed through the feed end to near atmospheric pressure as waste gas. The pressure may be further reduced to sub-atmospheric pressure by connecting gas flow outlet from the feed end of the first adsorbent bed to the suction end of a vacuum pump such that additional void space and desorbed gas is removed as additional waste gas.

6. Introducing a countercurrent purge gas from an adsorbent bed undergoing a second depressurization (step 4) into the product end of the first adsorbent bed and withdrawing a waste purge gas from the feed end of the first adsorbent bed down to a third intermediate pressure.

7. Countercurrently repressurizing the first adsorbent bed beginning at the third intermediate pressure by introducing pressurization gas into the product end of the first adsorbent bed up to a fourth intermediate pressure that is equal to or less than the first intermediate pressure, wherein the pressurization gas is provided from the product end of an adsorbent bed undergoing a first depressurization (step 3).

8. Countercurrently repressurizing the first adsorbent bed from the fourth intermediate pressure by introducing product gas into the product end of the first adsorbent bed, wherein the product gas is provided from the product end of an adsorbent bed undergoing step 2. At the end of this step, the first adsorbent bed is ready to begin step 1.

Steps 1 through 8 are repeated in a cyclic manner. In this example, the more strongly adsorbed component is nitrogen and the less strongly adsorbed component is oxygen, but the cycle may be used to separate other gas mixtures.

A cycle chart showing the eight-step process described above is given in Table 1 showing the relationship of the steps among the first bed described above (bed 1) and the other three beds (beds 2, 3, and 4).

TABLE 1

Cycle Chart for Four Bed PSA Process

| Bed | Process Step | | | | | | | |
|---|---|---|---|---|---|---|---|---|
| 1 | 1 | 2 | 3 | 4 | 5 | 6 | 7 | 8 |
| 2 | 7 | 8 | 1 | 2 | 3 | 4 | 5 | 6 |
| 3 | 5 | 6 | 7 | 8 | 1 | 2 | 3 | 4 |
| 4 | 3 | 4 | 5 | 6 | 7 | 8 | 1 | 2 |

The duration of the all process steps 1-8 may be equal. Alternatively, steps 1, 3, 5, and 7 each may have a first equal duration and steps 2, 4, 6, and 8 each may have a second equal duration shorter or longer that the first duration. A typical total cycle time may be in the range of 20 to 300 seconds.

In this cycle, purge gas is provided from a bed after the bed provides pressurization gas to another bed. In this sequence, the more strongly adsorbed component front is closest to the product end of the bed when purge gas is withdrawn, therefore making this gas more concentrated in the more strongly adsorbed component (i.e., "dirtier") than the pressurization gas. This "dirtier" purge gas is advantageous in this process, since subsequent countercurrent repressurization steps push the purge gas towards the feed end with gas that is less concentrated in the more strongly adsorbed component. It may be preferable in some cases to use "cleaner" gas for purging, and many known PSA cycles use product gas from a well-mixed product or surge tank for providing purge. In the process configuration of FIG. 2, however, it is not possible to provide purge gas from product tank 150 without using switching block valves and an associated controller. Since it is desired to eliminate the use of these valves, the provide purge gas step (step 4) follows the provide equalization pressurization gas step (step 3) in the PSA cycle described above. It has been found that this cycle with LiLSX can be used for the production of 3 to 10 ton per day of oxygen with a product purity of 90 vol % oxygen and an oxygen recovery of 60% and higher.

A PSA system using the cycle described above may be adapted for operation using a temperature-based control method. The duration of selected steps in the 4-bed cycle of Table 1 may be controlled by two timers identified as timer H1 and timer H2 wherein timer H1 controls the odd-numbered steps 1, 3, 5, and 7 and timer H2 controls the even-numbered steps 2, 4, 6, and 8. In one embodiment, timer H2 is fixed during all conditions such that steps 2, 4, 6, and 8 each have a given and equal duration. Timer H1 is allowed to automatically adjust the equal duration of steps 1, 3, 5, and 7 based on ambient temperature in order to compensate for the change in the feed air blower capacity as density of the air changes with temperature. The adjustment to timer H1 is made using a transmitter signal input that is proportional to the ambient temperature multiplied by a factor, and value of that signal is then added to a minimum value of timer H1. The duration of the cycle steps controlled by timer H1 will be increased during warmer weather and decreased during cooler weather. The PSA system then can operate without adjustment of manual product control valve 154 while a nearly constant purity of the oxygen product stream is maintained.

The use of indexed rotatable multi-port valves is illustrated above for a four-bed system operating in the described eight-step cycle, but valves of this type may be used in systems with other numbers of beds and other PSA cycles. This may be accomplished by selecting the proper number and alignment of the passages in the rotatable member and valve body and connecting the valves with the adsorbent vessels with an appropriately designed piping system. The indexed rotatable multi-port valves may be used in PSA systems for the separation of any gas mixture and is illustrated by the recovery of oxygen from air as described above. PSA separation systems with indexed rotatable multi-port valves may be used, for example, in the recovery of nitrogen from air, the recovery of hydrogen from hydrogen-containing mixtures, and the purification of helium.

Figure 3:
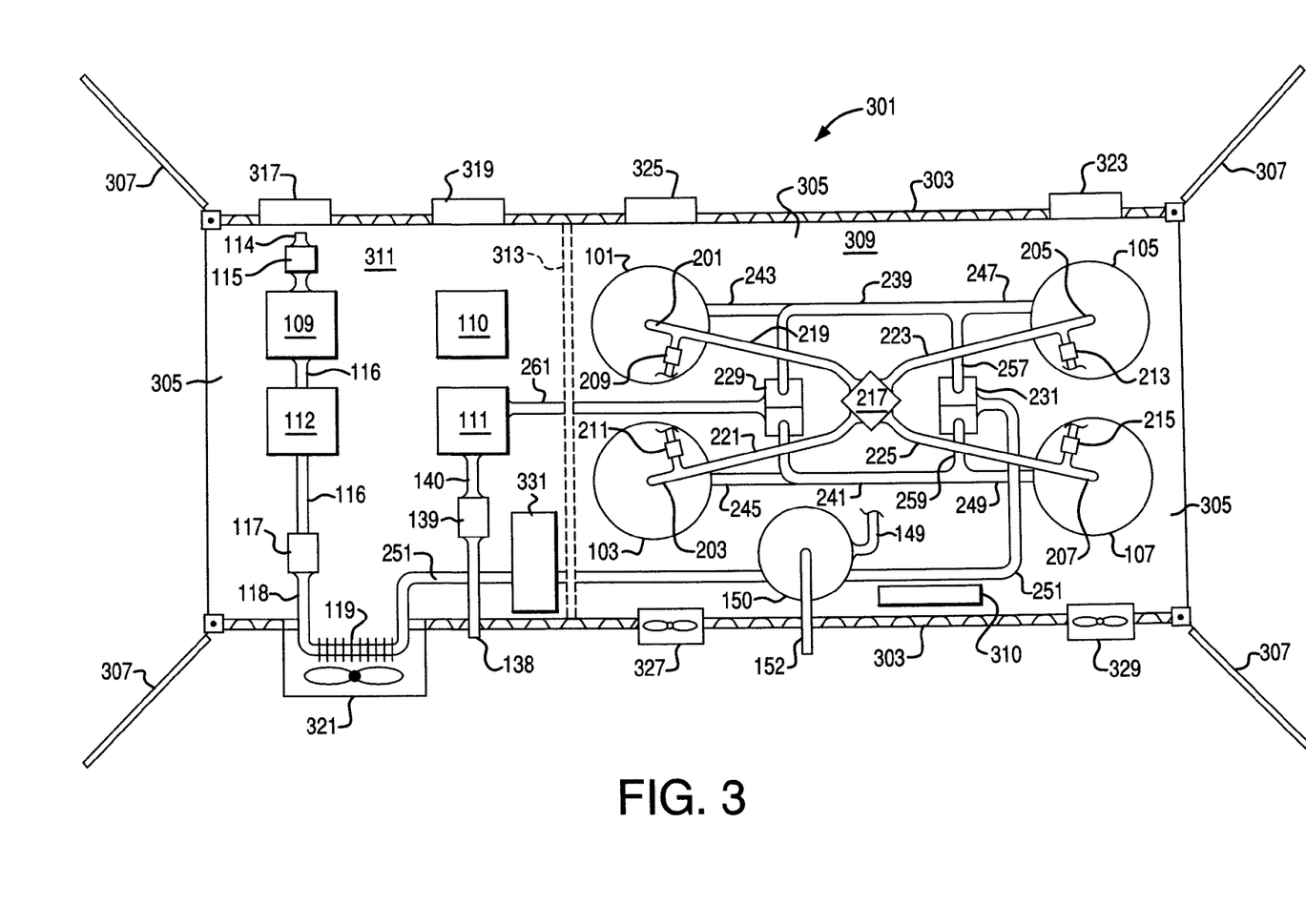
FIG. 3 is a schematic top view of a containerized gas separation system utilizing the process of FIG. 2.

In an embodiment of the present invention, the PSA system described above may be installed in a standard 20 ft ISO container as illustrated in the plan view of FIG. 3. Container 301 is formed by external corrugated steel walls 303, steel floor 305, a roof (not shown in this drawing), and hinged latchable doors 307 at either end. The container is divided into adsorber section 309 and blower section 311 by optional partition 313. The components of the PSA system of FIG. 2 are configured in the container as shown in FIG. 3.

Air inlets and air moving systems are installed in the container walls to direct cooling air over the process components and to provide for process air intake. Air inlet openings 317 and 319 provide for air ingress into blower section 311, and the air is withdrawn by exhaust fan 321. Air flowing through blower section 311 removes heat generated by drive motors 110 and 112 and provides cooling for aftercooler 119. Air inlet openings 323 and 325 allow air ingress into adsorber section 309, and the air is withdrawn by exhaust fans 327 and 329. Air flowing through adsorber section 309 removes heat generated by the adsorption steps in the adsorber vessels and prevents the development of a high or low oxygen environment in the case of a leak in the PSA system. The PSA system typically is operated with doors 307 closed to provide weather protection, sound attenuation, and security for unattended operation.

Adsorbent vessels 101, 103, 105, and 107 are mounted on the floor of adsorber section 309. Programmable logic controller or computer control system 310 is adapted to control both indexing valve drive motors 227 and 233 (not shown). Feed air compressor 109, compressor drive motor 112, vacuum blower 111, and vacuum blower drive motor 110 are installed in blower section 311. Compressor drive motor 112 drives compressor 109 via a drive belt or a drive shaft (not shown) and blower drive motor 110 drives vacuum blower 111 via a drive belt or a drive shaft (not shown). Other components installed in blower section 311 as described above with reference to FIG. 2 include air inlet 114, silencer 115, aftercooler 119, waste gas discharge line 138, and silencer 139. Power control panel 331 controls the power to equipment in blower section 311.

The valves to deliver and withdraw gas from the adsorbent vessels in adsorber section 309 as described above with reference to FIG. 2 and as shown in FIG. 3 include indexed rotatable multi-port valve 217 at the product ends of the vessels, indexed rotatable multi-port valves 229 and 231 at the feed ends of the vessels, and check valves 209, 211, 213, and 215 at the product ends of vessels 101, 103, 105, and 107, respectively. Indexing valve drive motors 227 and 233 are not shown in FIG. 3.

The piping segments in FIG. 3 correspond to the piping segments in FIG. 2 as follows. Piping segments for gas flow in blower section 311 include line 116 connecting feed air compressor 109 with silencer 117, line 118 connected with aftercooler 119, line 140 connecting the discharge of vacuum blower 111 with silencer 139, line 251 connecting the outlet of aftercooler 119 with indexed rotatable multi-port valve 231, and line 261 connecting vacuum blower 111 with indexed rotatable multi-port valve 229.

Piping segments for gas flow in adsorber section 309 include line 251 connecting the outlet of aftercooler 119 with indexed rotatable multi-port valve 231, line 261 connecting the inlet of vacuum blower 111 with indexed rotatable multi-port valve 229, and product outlet line 152. Lines 201 and 219, 203 and 221, 205 and 223, and 207 and 225 connect the respective product (top) ends of adsorber vessels 101,103, 105, and 107 with indexed rotatable multi-port valve 217. Product gas flows from adsorbent vessels 101, 103, 105, and 107 through check valves 209, 211, 213, and 215, respectively. The product gas from these check valves flows to product tank 150 via manifold 149, which is shown only partially in FIG. 3 to simplify the drawing. Manifold 149 is shown in full in FIG. 2.

The feed (bottom) end of adsorbent vessel 105 is connected to line 247, which in turn is connected to lines 239 and 257, which in turn are connected to respective indexed rotatable multi-port valves 229 and 231. The feed (bottom) end of adsorbent vessel 107 is connected to line 249, which in turn is connected to lines 241 and 259, which in turn are connected to respective indexed rotatable multi-port valves 229 and 231. The feed (bottom) end of adsorbent vessel 101 is connected to line 243, which in turn is connected to lines 235 and 253 (these lines are shown in FIG. 2 but not in FIG. 3), which in turn are connected to respective indexed rotatable multi-port valves 229 and 231. The feed (bottom) end of adsorbent vessel 103 is connected to line 245, which in turn is connected to lines 237 and 255 (these lines are shown in FIG. 2 but not in FIG. 3), which in turn are connected to respective indexed rotatable multi-port valves 229 and 231.

The gas separation system 301 of FIG. 3 is shown with the doors 307 in open positions. Individual components or pre-assembled sub-units can be loaded readily through the open ends into the container during assembly. For example, the adsorbent vessels may be individually installed and bolted to the container floor. Alternatively, the adsorbent vessels may be mounted on a skid (i.e., a metal frame or support) that is bolted or otherwise attached to the interior of the container. An adsorbent vessel skid sub-unit may include some or all of the piping and valves described above with reference to FIGS. 2 and 3. A sub-unit may comprise one or more of the indexed rotatable multi-port valves 217, 229, and 231 with some of the attached piping. In another pre-assembled skid sub-unit configuration, feed blower 109, drive motor 112, vacuum blower 111, and drive motor 110 may be mounted on a skid with protective cages for the motor-blower belt drives. This skid may include line 116 and silencers 115, 117, and 139. The remaining piping segments are installed after the skid is loaded into the container. The product tank may comprise another sub-unit. Sound-absorbing material may be attached to interior surfaces of the container at any appropriate time during assembly.

Mounting the gas separation system equipment components on one or more skids or sub-units allows ease of assembly and provides for simplified removal of worn or defective components for replacement or repair. The skids or sub-units may be moved and maneuvered readily using a standard forklift. In order to ensure maneuverability, each skid or sub-unit may be no wider than 7 ft 7 in and no taller than 7 ft 5 in. Typically, each skid or sub-unit weighs less than 4000 lb and may weigh less than 3000 lb. To accomplish this, no individual component of the gas separation system, (e.g., adsorbent vessel or product tank) would weigh more than 2500 lb.

In a typical embodiment, a complete containerized PSA air separation system for a maximum production of between 3 and 8 ton per day (TPD) of oxygen at 90 vol % purity may have a maximum total weight of 25,000 lb and may have a weight of less than 20,000 lb. The containerized gas separation system in this and other embodiments may be transportable by a single tractor-trailer.

The volume of product tank 150 may be selected to allow the installation of the entire PSA system in a standard container. In order to allow installation in a standard 20 ft ISO container, product tank 150 typically should have a volume of less than 400 gal and may have a volume of less than 240 gal. In one embodiment, the product tank is cylindrical in shape and is less than 89 in high and may be less than 60 in high. The tank may have a diameter of less than 36 in and may have a diameter of less than 30 in. In the production of oxygen from air, for example, the ratio of the product tank volume to production rate is between 80 and 133 gal/TPD at a production rate of 3 TPD and between 30 and 50 gal/TPD at a production rate of 8 TPD. This is possible when using the exemplary four-bed PSA cycle described above because all gas introduced into the product end of a bed comes from other beds rather than the product tank. This allows the use of a much smaller product tank volume than with other PSA cycles in which product gas is used for purge and/or repressurization. It also minimizes product pressure fluctuation since there is constant flow into the product tank, and gas is withdrawn only as product to the end user.

If adsorbent material is used within product tank 150, the size can be reduced by a factor as high as 4. In one embodiment using the PSA system of FIGS. 2 and 3, a 120 gallon product tank (Steelfab model A11176) is filled with CaX zeolite adsorbent, providing a ratio of product tank volume to production rate of product gas of between 15 and 40 gal/TPD. The use of adsorbent material can be used to reduce the size of the product tank for other PSA cycles including cycles that have steps wherein product gas flows from the tank to the adsorbent beds. A small product tank is necessary for all of the sub-units of the PSA system to fit into a standard container according to embodiments of the invention.

In an embodiment of a containerized gas separation system, the system may have a maximum production rate of 3 to 8 TPD of contained oxygen at an oxygen purity of greater than 90 vol %. This system may utilize, for example, the PSA system of FIGS. 2 and 3 installed in a standard 20 ft ISO container, which has a container volume (i.e., the volume defined by the outer dimensions of the container) of 1,360 $ft^3$. In this example, the ratio of the container volume to the gas production rate (i.e., the product gas flow rate as earlier defined) may be a maximum of 453 $ft^3$/TPD at a production rate of 3 TPD and a maximum of 170 $ft^3$/TPD at a production rate of 8 TPD. Stated alternatively, the ratio of the container volume to the gas production rate may be between 453 $ft^3$/TPD and 170 $ft^3$/TPD at maximum production rates of 3 TPD and 8 TPD, respectively. These ratios are approximately an order of magnitude lower, for example, than the ratio for the comparable commercially-available AirSep AST-6/10 PSA system marketed by AirSep Corporation. This system can produce 4.8 to 8.0 TPD of product flow (i.e., the product gas flow rate as earlier defined) containing oxygen at 90-93 vol % oxygen purity and requires a system volume with dimensions of 40 ft by 40 ft by 18 ft high, which gives a ratio of system volume to production rate in the range of 3,600 to 6,000 $ft^3$/TPD.

Other embodiments of the present invention may be used in modular arrangements to provide higher gas production rates. For example, two of the 20 ft containerized systems described above may be combined and operated in parallel to generate a maximum 6 TPD or 16 TPD of product flow, containing oxygen at an oxygen purity of greater than 90 vol %. Depending on the available space at an installation site, the containers may be placed at grade side-by-side, at grade end-to-end, stacked vertically with one container at grade and the other on top, or placed in any other desired orientation. In another example, a production rate of 15 TPD may be provided by combining three 5 TPD units or two 7.5 TPD units with the product flow piped to a common header. As in the previous example, depending on the available space at an installation site, the containers may be placed side-by-side, placed end-to-end, stacked vertically, or placed in any other desired orientation.

Other container combinations are possible to obtain improved power efficiency and/or decreased capital costs. For example, a containerized PSA system could be designed using two standard ISO containers wherein eight adsorbent beds (i.e., two four-bed systems) are installed in one container, a single feed blower, a single vacuum blower, and drive motors for the blowers are installed in the other container, and the product gas storage tank is installed in either container. Appropriate inter-container and intra-container piping would be used to couple the containerized components as required.

Two or more coupled parallel containerized systems may be installed for applications in which the user's product demand varies diurnally, seasonally, or for process-specific reasons. For example, two parallel containerized systems may be used to provide for product turndown as needed by shutting off one of the systems. A single containerized system may be designed for turndown operation wherein the feed and product blower motors use variable frequency drives (VFD) or alternating current (AC) motors with two sets of windings.

In another embodiment, the modularity concept may be extended further by the use of liquid oxygen (LOX) for part of the product flow requirements. For example, if a user needs 17 TPD of oxygen, it may be possible to supply 2 TPD by LOX and the balance by two containerized gas separation units each producing 7.5 TPD. A user may install two or more parallel containerized systems wherein one of the systems serves as a backup or spare.

The installation of a pressure swing adsorption system at an operating site typically comprises the steps of assembling a containerized pressure swing adsorption system at an assembly site in a fabrication shop wherein the system includes one or more ISO containers having any of the configurations described above. Each ISO container may have installed therein one or more components of a pressure swing adsorption system selected from the group consisting of two or more vessels, each vessel having a feed end, a product end, and adsorbent material adapted to adsorb one or more components from the feed gas mixture to provide a product gas; a product gas storage tank; a feed blower adapted to introduce the feed gas mixture into the feed ends of the vessels and a feed blower driver; a vacuum blower adapted to withdraw waste gas from the product ends of the vessels and a vacuum blower driver; and an indexed rotatable multi-port valve adapted to place the product end of each vessel in sequential flow communication with the product end of each of the other vessels.

The completed containerized pressure swing adsorption system comprising one or more ISO containers may be transported from the assembly site to the operating site using any combination of truck, train, barge, ship, or airplane. At the operating site, the system is unloaded using standard methods for lifting ISO containers and placed on a previously-prepared operating site. Utilities are connected to the system and piping or a piping connection is installed to provide the product gas to the gas consumer. Utilities typically include electric power and optionally include a product booster compressor, telecommunication lines, and instrument air.

The modular containerized concept described above may be used in a wide variety of applications by skilled designers of gas separation systems. Because these gas separation system sub-units can be handled by common forklifts, easy installation of pre-assembled sub-units in standard ISO shipping containers and flexible arrangement within the containers are possible to provide ease of maintenance or to minimize piping runs. The containerized gas separation systems described herein can be assembled at a manufacturing shop such that the systems are essentially ready for turnkey operation upon leaving the shop. The installation of a containerized gas separation system at an installation site will require minimum site preparation; only a level gravel surface is required rather than the concrete pad typically required for site-assembled systems. The containerized gas separation systems can be unloaded from a tractor-trailer or train using a single forklift or two forklifts operating in combination, or a crane may be used if available and necessary. The only additional site work needed is connection of the containerized systems to a power source and piping connections for product gas delivery to the user. Optionally, a telephone line or other signal connection can be made if remote monitoring of the system is desired. Additionally, major field maintenance is possible with only a small forklift.

Other embodiments of the invention may be used in specific applications in which a tradeoff of operating power versus capital cost is desired. For example, oxygen produced by PSA systems in the 5 to 20 TPD range may be provided by the vendor to purchasers under either of two commercial arrangements: (1) sale of the PSA system to the purchaser, who then owns and operates the system (typically defined as "sale of equipment") and (2) sale of gas to the purchaser wherein the vendor owns and operates the system (typically defined as "sale of gas"). It is possible for the vendor to design containerized PSA gas separation systems to meet either of these requirements using embodiments of the invention to provide a given amount of product gas with a desired balance between capital cost and operating power consumption.

Typically, a PSA system designed to minimize power consumption has a higher capital cost; conversely, a system designed to minimize capital cost typically consumes more power. When the containerized PSA system is installed in a given standard container size, most of the increased or decreased capital cost is related to the adsorber vessel size and the amount of adsorbent in the vessels, the PSA cycle time, and the efficiency of the feed and vacuum blowers. More adsorbent generally results in lower power consumption, and less adsorbent generally results in higher power consumption, all else being equal. More efficient blowers are generally more expensive than less efficient blowers. Shorter cycle times require less adsorbent than longer cycle times, but may lead to lower product recovery and higher power consumption.

The PSA systems described above may be modified according to another embodiment of the invention in order to increase or decrease the amount of adsorbent used in the containerized system. In this embodiment, each single adsorbent vessel is replaced by a plurality of smaller vessels that operate in parallel as a single adsorbent pseudo-bed. This feature is described in U.S. patent application Ser. No. 11/490,003 filed on Jul. 20, 2006 and entitled "Pressure Swing Adsorption Method and System with Multiple-Vessel Beds", which application is wholly incorporated herein by reference. When multiple-vessel beds are used in the containerized PSA system, the amount of adsorbent can be increased or decreased easily by changing the number of vessels that make up each bed. This embodiment can be used to "tune" a design to a desired balance between lower capital/higher power and higher capital/lower power.

Embodiments of the invention may be utilized in new or modified business models for the sale of gas separation systems. Since the PSA systems in these embodiments are completely containerized, the systems are simple to install (no foundations or cranes are required) and can be uninstalled and moved easily for redeployment. This ease of redeploying the containerized systems allows more flexibility in commercial arrangements, thereby providing commercial options in addition to standard multi-year liquid delivery arrangements or longer-term onsite arrangements. Since the cost of oxygen is very competitive, embodiments of the invention may lead to new markets and applications for oxygen use. The modular containerized approach described herein can meet incremental product demands and allow flexible pricing terms for incremental supply to purchasers.

While an embodiment of a containerized gas separation systems invention is illustrated above by a specific four-bed PSA system operating in an eight-step cycle, any desired number of beds and any appropriate PSA cycle may be used in other embodiments of the invention. As described above, each single adsorbent vessel in any embodiment may be replaced by a plurality of smaller vessels that operate in parallel as a single adsorbent pseudo-bed. While an embodiment of the present invention is illustrated above for the recovery of oxygen from air by pressure swing adsorption, the principle of containerized PSA systems can be used for the separation of other gases. For example, the PSA system may be designed to separate nitrogen from air by using an appropriate adsorbent and cycle for operating the plurality of adsorbent vessels. In other applications, the containerized gas separation systems may be used for the separation of hydrogen from hydrogen-containing streams, methane from methane-containing streams such as coal seam gas or landfill gas, and argon from argon-containing streams, especially for recovery of argon from industrial processes.

EXAMPLE

A 4-bed VPSA system as illustrated in FIG. 3 was installed in a 20 ft ISO container having an empty internal volume of about 1360 ft$^3$. The system comprised four adsorber vessels each having a bed height of 60 in and an outer diameter of 30 in. The four vessels each contained a pretreatment layer of NaX zeolite at the feed end of the bed comprising 20% of the bed height and a main layer of LiLSX zeolite comprising the remaining 80% of the bed height. The product gas storage tank was 16 cu ft and was filled with CaX zeolite to increase its effective working capacity. There were two air movers, the vacuum compressor and the feed air blower, and the air movers were both Roots-type blowers with silencers at the inlet and discharges. The feed blower was connected to a five-port indexed ball valve which directed feed flow into each of the beds according to the selected process cycle steps and durations. The vacuum compressor was connected to a second five-port indexed ball valve which provided vacuum to each of the four beds according to the selected process cycle steps and durations. A third multi-port indexed valve connected the product end of each of the four beds for pressure equalizations and purge.

The VPSA system was operated according to the following process cycle:

| Step | Duration, sec | Description |
| --- | --- | --- |
| 1 | 6.6 | Feed |
| 2 | 5.8 | Feed and Provide Repressurization |
| 3 | 6.6 | Provide Equalization |
| 4 | 5.8 | Provide Purge |
| 5 | 6.6 | Evacuation |
| 6 | 5.8 | Evacuation and Receive Purge |
| 7 | 6.6 | Receive Equalization |
| 8 | 5.8 | Receive Repressurization |

The system was operated at a production rate of 2530 standard liters per minute (slpm) or 5.38 ton/day product flow rate with an average product purity of 91 volume % oxygen. This equates to a contained oxygen production rate of 4.86 tons per day. The product tank pressures ranged from 6.0 to 7.0 psig and the adsorber bed pressures ranged from 9.0 psig to −9.5 in Hg measured at the product ends of the vessels. The system was operated with ambient temperatures of 55° F. external and 58° F. internal to the container. The ratio of the exterior volume of the container to the product gas flow rate was 253 ft$^3$/(ton per day).

The invention claimed is:
1. A containerized gas separation system comprising
 (a) a container having an interior, an exterior, and a container volume defined by the outer dimensions of the container and
 (b) a single pressure swing adsorption system installed in the interior of the container and adapted to selectively adsorb nitrogen from air to provide a product gas comprising at least 80 vol % oxygen at a product gas flow rate, wherein the ratio of the container volume to the product gas flow rate is less than about 2000 ft$^3$/(ton per day) and wherein the pressure swing adsorption system comprises (1) two or more vessels, each vessel having a feed end, a product end, and adsorbent material adapted to selectively adsorb nitrogen from air;

(2) piping adapted to introduce the feed gas mixture into the feed ends of the vessels, piping adapted to withdraw the product gas from the product ends of the vessels, piping adapted to place the product ends of any pair of vessels in flow communication, and piping adapted to withdraw a waste gas from the feed ends of the vessels; and (3) an indexed rotatable multi-port valve adapted to place the product end of each vessel in sequential flow communication with the product end of each of the other vessels.

2. The containerized gas separation system of claim 1 comprising any of a blower adapted to introduce the feed gas mixture into the feed ends of the vessels, a vacuum blower adapted to withdraw waste gas from the feed ends of the vessels, and a product gas storage tank.

3. A containerized gas separation system comprising
(a) a container having an interior, an exterior, and a container volume defined by the outer dimensions of the container and
(b) a single pressure swing adsorption system installed in the interior of the container, wherein the pressure swing adsorption system consists essentially of a pressure swing adsorption unit adapted for the selective adsorption of nitrogen from air to provide a product gas comprising at least 80 vol % oxygen at a product gas flow rate, wherein the ratio of the container volume to the product gas flow rate is less than about 2000 ft$^3$/(ton per day) and wherein the container is an ISO container as defined by the International Organization for Standardization.

4. A containerized gas separation system comprising one or more ISO containers, each ISO container having an interior, an exterior, and a container volume defined by the outer dimensions of the container, wherein components of a single pressure swing adsorption system are installed in the interior or interiors of the one or more ISO containers, and wherein the components of the single pressure swing adsorption system consist essentially of (a) two or more vessels, each vessel having a feed end, a product end, and adsorbent material adapted to selectively adsorb nitrogen from air to provide a product gas comprising at least 80 vol % oxygen;
(b) a product gas storage tank;
(c) a feed blower adapted to introduce the feed gas mixture into the feed ends of the vessels and a feed blower driver;
(d) a vacuum blower adapted to withdraw waste gas from the feed ends of the vessels and a vacuum blower driver; and
(e) an indexed rotatable multi-port valve adapted to place the product end of each vessel in sequential flow communication with the product end of each of the other vessels.

5. The containerized gas separation system of claim 4 wherein the single pressure swing adsorption system has four vessels, each of which contains the adsorbent material adapted to selectively adsorb nitrogen from air.

6. The containerized gas separation system of claim 4 wherein the pressure swing adsorption system is adapted to deliver the product gas at a product gas flow rate and the ratio of the container volume to the product gas flow rate is less than about 1000 ft$^3$/(ton per day).

7. The containerized gas separation system of claim 4 comprising two ISO containers, wherein
(1) one of the containers has installed therein two or more vessels, each vessel having a feed end, a product end, and the adsorbent material adapted to selectively adsorb nitrogen from air to provide the product gas comprising at least 80 vol % oxygen and
(2) the other of the containers has installed therein a feed blower adapted to introduce the feed gas mixture into the feed ends of the vessels, a feed blower driver, a vacuum blower adapted to withdraw waste gas from the feed ends of the vessels, and a vacuum blower driver.

8. The containerized gas separation system of claim 7 comprising a product gas storage tank installed within either of the two ISO containers.

9. A containerized gas separation system comprising two ISO containers, each container having installed therein a single pressure swing adsorption system comprising
(a) two or more vessels, each vessel having a feed end, a product end, and adsorbent material adapted to adsorb one or more components from the feed gas mixture to provide a product gas;
(b) a product gas storage tank having an inlet and an outlet;
(c) a feed blower adapted to introduce the feed gas mixture into the feed ends of the vessels and a feed blower driver; and
(d) a vacuum blower adapted to withdraw waste gas from the feed ends of the vessels and a vacuum blower driver;
wherein the outlets of the product gas storage tanks are connected to a single product delivery pipe.

10. The containerized gas separation system of claim 9 wherein the two ISO containers are installed at an operating site at grade level.

11. The containerized gas separation system of claim 9 wherein the first of the ISO containers is installed at an operating site at grade level and the second of the ISO containers is stacked on top of the first ISO container.

12. A containerized gas separation system comprising an ISO container having installed therein a single pressure swing adsorption system adapted to separate air to provide an oxygen-containing product gas having a composition of at least 80 vol % oxygen, wherein the single pressure swing adsorption system comprises (a) four vessels, each vessel having a feed end, a product end, and adsorbent material adapted to selectively adsorb nitrogen from air to provide the oxygen-containing product gas at a product gas flow rate equal to or less than a product gas design flow rate;
(b) a product gas storage tank;
(c) a feed blower adapted to introduce the pressurized air into the feed ends of the vessels and a feed blower driver;
(d) a vacuum blower adapted to withdraw waste gas from the feed ends of the vessels and a vacuum blower driver; and
(e) an indexed rotatable multi-port valve adapted to place the product end of each vessel in sequential flow communication with the product end of each of the other vessels.

13. The containerized gas separation system of claim 12 wherein the ISO container is a 20 ft ISO container and the pressure swing adsorption system is adapted to provide a maximum product gas flow rate between 3 and 8 ton per day of flow of oxygen-containing product gas.

14. The containerized gas separation system of claim 12 wherein the adsorbent material comprises one or more adsorbents selected from the group consisting of alumina, CaA, NaX, CaX, and LiX zeolites.

15. The containerized gas separation system of claim 12 wherein the product gas storage tank contains an oxygen-selective adsorbent.

16. A method for the recovery of a product gas from a feed gas mixture comprising
 (a) providing a gas separation system comprising an ISO container having an interior, an exterior, and a container volume defined by the outer dimensions of the container, wherein the container has installed therein a single pressure swing adsorption system comprising
  (1) two or more vessels, each vessel having a feed end, a product end, and adsorbent material adapted to adsorb one or more components from the feed gas mixture to provide a product gas at a product gas flow rate;
  (2) a product gas storage tank;
  (3) a feed blower adapted to introduce the feed gas mixture into the feed ends of the vessels and a feed blower driver;
  (4) a vacuum blower adapted to withdraw waste gas from the feed ends of the vessels and a vacuum blower driver; and
  (5) an indexed rotatable multi-port valve adapted to place the product end of each vessel in sequential flow communication with the product end of each of the other vessels;
 (b) introducing the feed gas mixture into a first vessel and withdrawing the product gas from the first vessel at the product gas flow rate;
 (c) depressurizing the first vessel by withdrawing depressurization gas from the product end of the vessel and transferring the depressurization gas to the product end of another vessel via the indexed rotatable multi-port product valve while the indexed rotatable multi-port product valve is in a first indexed rotational position;
 (d) withdrawing waste gas from the feed end of the first vessel using the vacuum blower;
 (e) pressurizing the first vessel by introducing into the product end of the vessel a depressurization gas provided from another vessel that is undergoing step (c), wherein the gas is transferred via the indexed rotatable multi-port product valve while the indexed rotatable multi-port product valve is in a second indexed rotational positions and
 (f) repeating steps (b) through (e) in a cyclic manner.

17. The method of claim 16 wherein the ratio of the container volume to the product gas flow rate has a value of less than about 1000 ft$^3$/(ton per day).

18. The method claim 16 wherein the feed gas mixture is air and the product gas is an oxygen-containing gas with a composition of at least 80 vol % oxygen.

19. The method of claim 18 wherein the ratio of the container volume to the product gas flow rate has a value of less than 453 ft$^3$/(ton per day) at a product flow rate of at least 3 ton per day.

20. A method for the installation of a pressure swing adsorption system at an operating site comprising
 (a) assembling a containerized pressure swing adsorption system at an assembly site wherein the system comprises one or more ISO containers, each ISO container having installed therein one or more components of a single pressure swing adsorption system selected from the group consisting of
  (1) two or more vessels, each vessel having a feed end, a product end, and adsorbent material adapted to adsorb one or more components from the feed gas mixture to provide a product gas;
  (2) a product gas storage tank;
  (3) a feed blower adapted to introduce the feed gas mixture into the feed ends of the vessels and a feed blower driver;
  (4) a vacuum blower adapted to withdraw waste gas from the feed ends of the vessels and a vacuum blower driver; and
  (5) an indexed rotatable multi-port valve adapted to place the product end of each vessel in sequential flow communication with the product end of each of the other vessels;
 thereby providing a completed containerized pressure swing adsorption system that includes the components in (1) through (5);
 (b) transporting the completed containerized pressure swing adsorption system from the assembly site to the operating site; and
 (c) unloading the completed containerized pressure swing adsorption system and placing it on the operating site, connecting utilities to the system, and installing piping adapted to provide the product gas to a gas consumer.

21. The method of claim 20 wherein the containerized pressure swing adsorption system is transported by one or more transportation systems selected from the group consisting of truck, train, barge, ship, and airplane.

* * * * *